July 7, 1964 W. H. KAGLEY 3,139,916
QUICK CHANGE TORQUE PLATE MOUNTING
Filed June 8, 1962 3 Sheets-Sheet 2

WILLIAM HERBERT KAGLEY
INVENTOR.

BY Huebner & Worrel
ATTORNEYS.

United States Patent Office 3,139,916
Patented July 7, 1964

3,139,916
QUICK CHANGE TORQUE PLATE MOUNTING
William H. Kagley, Dinuba, Calif., assignor to Lindsay Ripe Olive Company, Lindsay, Calif., a corporation of California
Filed June 8, 1962, Ser. No. 201,215
3 Claims. (Cl. 146—27)

This invention relates to a structural member, specifically a torque plate, and the means for mounting it as an element in a fruit pitting machine such as an olive pitting machine.

An example of a machine of the character identified is disclosed in Patent No. 2,341,857, granted February 15, 1944, on an application of Drake, Alberty and Kagley (Kagley being the present applicant herein); and an improvement over the patent identified is found in Patent No. 2,816,587, granted December 17, 1957, on an application of said Kagley, and Milam.

These machines embody specially fabricated rigidly connected drums, and each drum essentially comprises a set of axially separated generally annular structures carrying multiple operating mechanisms. These annular structures are formed with many slots and apertures and under the torsion of operative rotation would twist with a resulting malfunction unless rigidified. For this latter purpose torque plates are employed.

Heretofore the torque plates have been secured by machine bolts threaded horizontally at one end and vertically at the other end into the respective parts of the drum. The horizontal machine bolts can be inserted and withdrawn fairly readily because the location of their heads is accessible. However, the vertical (transverse to the axis of the drum) machine bolts have had to be inserted at an incomplete stage of assembly of the machine due to the fact that when the drums are placed in operative position the frame of the machine overlies the heads of the machine bolts in immediate proximity thereto thus rendering the heads of the machine bolts virtually inaccessible. By the nature of the machine the central region between frame members (FIGURE 1) has water running and splashing (where the olives are being operated on), and the regions outside the frame members (FIGURE 1) has lubricating oil freely applied to the cams and other moving parts. In order to prevent water splashing over into the lubricating section, and vice versa, the frame members are made close, which results in the inaccessibility of the machine bolts. Consequently, whenever the torque plates required removal it has been necessary to pull the drums in order to obtain access to the machine bolts located in conjunction with the innermost of the two annular structural elements. A primary reason for removal of the torque plates is to gain access to the olive die and punch assemblies for repair or replacement.

I have discovered that I can achieve accessibility of the bolt heads and at the same time obtain a more rigid securement of the torque plates by providing a specially designed boss at the mounting region and forming the boss with a bore oblique to the axis of the drum through which a machine bolt can be inserted and threaded into the drum section.

It is therefore an object of the invention to provide an improved torque plate mounting construction wherein the head of the attaching machine bolt is disposed outside of the frame structure which overlies the peripheral end region of the torque plate, and the bolt is thus made accessible; and by providing through the use of this boss an oblique introduction of the machine bolt through the boss into the drum member a compound force is imposed, namely both axially and radially, to pull the torque plate axially and at the same time to clamp it radially upon the external surface of the drum member.

A further object of the invention is to provide a torque plate structure of improved mechanical design and rigidity.

These and other objects and advantages of the invention will become apparent from an examination of the drawings and a consideration of the description which follows.

Figure 1:
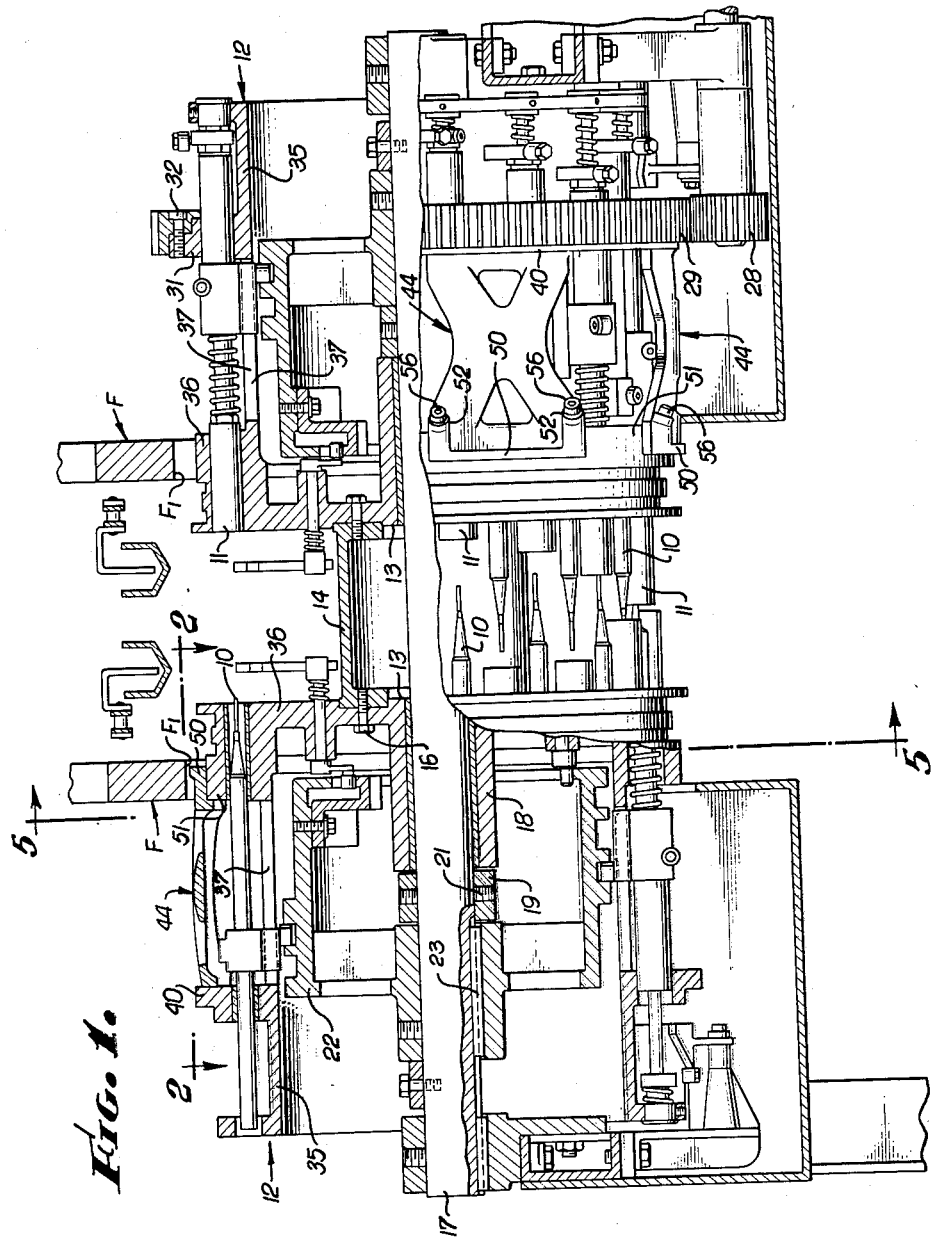
FIGURE 1 is a longitudinal sectional view of a major portion of the fruit pitting machine showing certain of the torque plates mounted on the drum elements.
Figure 2:
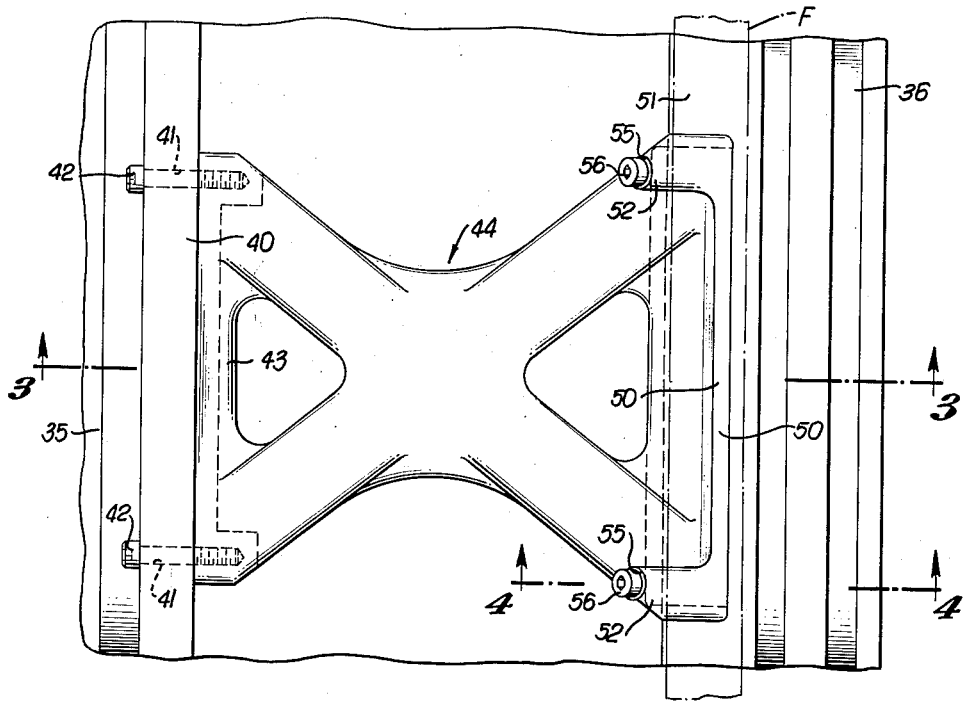
FIGURE 2 is an enlarged plan view taken on the line 2—2 of FIGURE 1.
Figure 3:
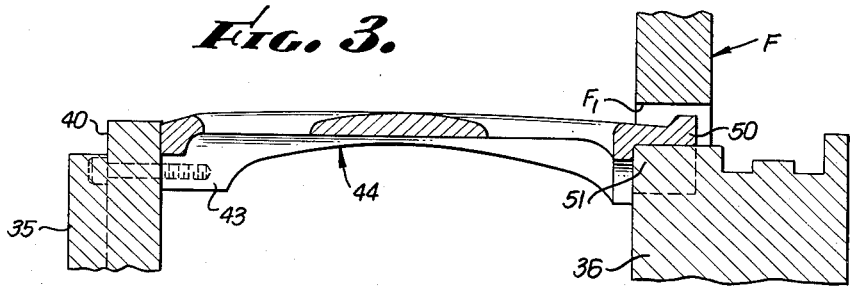
FIGURE 3 is a sectional view taken on the line 3—3 of FIGURE 2.
Figure 4:
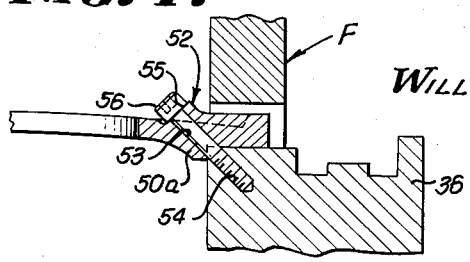
FIGURE 4 is a fragmentary sectional view taken on the line 4—4 of FIGURE 2.

In FIGURE 1, punches 10 and dies 11 are shown mounted opposite each other on axially spaced apart drums 12. At their inner ends 13 the drums are rigidly connected in axially spaced relationship with respect to each other by a central annular connecting member 14 and cap screws or machine bolts 16.

The interconnected drums 12 are rotatably mounted on a fixed shaft 17 by drum hubs 18 connected to or integral with the drum ends 13. Spacers 19 are fastened to shaft 17 by set screws 21 and axially position the drums 12 during rotation thereof on the shaft. Within each drum a stationary cam barrel 22 is mounted on the shaft 17, being keyed thereto as at 23 to prevent rotation.

The drums are rotated by any suitable prime mover such as an electric motor (not shown) acting through a small gear 28 which meshes with a ring gear 29 fastened to a circumferential flange 31 of one of the drums by cap screws 32.

Each of the drums comprises an outer generally annular barrel type member 35 and an inner generally annular wheel type member 36. These members are united by sleeves 37 but these sleeves are necessarily so formed with slots for the reciprocating parts to move in, that they are inadequate to properly rigidify the drums.

The outer members 35 are each formed with an annular shoulder 40 which is bored at 41 to receive a machine bolt 42 which is threaded into a downturned flange portion 43 of a torque plate 44.

The torque plate is generally X shaped in plan with opposite ends of the X being closed by transverse arcuate webs drawn generally on a radius concentric with the radius of the drum members 35 and 36. The body of the plate is also slightly arched overall which contributes to its rigidity.

It will be noted that the inner end of each torque plate is formed with an annular shoulder section 50 having a right angled notch as seen in cross section which seats upon the annular edge surface region 51 of the inner drum member 36.

The operative parts of the machine are mounted on a frame which includes frame elements F. These frame elements are disposed in vertical alignment with the inner ends of the torque plates and with arcuate edges F1 of the frame members in close proximity to the torque plates. Furthermore, because of the overall construction of the machine, access to any machine bolts radially clamping the inner ends of torque plates to the drum elements 36 heretofore has not been found possible so long as the torque plates remain in their finally assembled position as shown in FIGURE 1, and it has been necessary in cases where the torque plates had to be removed to loosen the drum assembly from the central connecting member 14, and shift the drum assembly outward on the shaft 17, coupled with other incidental measures necessary, to expose the heads of the machine bolts. To overcome this difficulty we employ the structure next described which is an important part of the present invention.

Special bosses 52 are formed at opposite ends of the flange 50. These bosses are each provided by adding sufficient metal above the surface plane of the adjacent flange region to provide an enlargement having adequate thickness so that an oblique bore 53 may be formed therein, the axis of which is at an acute angle to the underlying axis of the drum. Such angle satisfactorily may be in the general magnitude of 45°, but is not limited to that degree. The lower section of the boss is provided by the inturned annular flange 50a which provides the vertical wall of the notch in the shoulder section 50.

A threaded bore 54 is provided in the drum member 36 at the edge surface region 51 contiguous to the torque plate shoulder and with its axis coincident with the axis of the bore 53. The boss is provided with a flat tension face 55 disposed in a plane normal to the axis of the bore 53 against which face the head of a machine bolt 56 may be drawn.

This machine bolt head, by virtue of the boss which forms a part of the mounting, is disposed externally outwardly of the frame member F. As the result, bolt 56 may be inserted or removed at any time desired without disturbing the mounting of the drum members on the shaft. The other cap screws 42 are readily accessible at all times. The torque plate may thus be quickly removed and replaced. When the bolt 56 is drawn tight a compound securement force is exerted both radially and axially of the drum member to hold the parts firmly against separation in either direction. This is the heavy end of the drum assembly where primary securement is important. The attachment of the machine bolts 42 is at the light end of the drum assembly and they are adequate at that point and readily accessible by reason of their horizontal placement.

Figure 5:
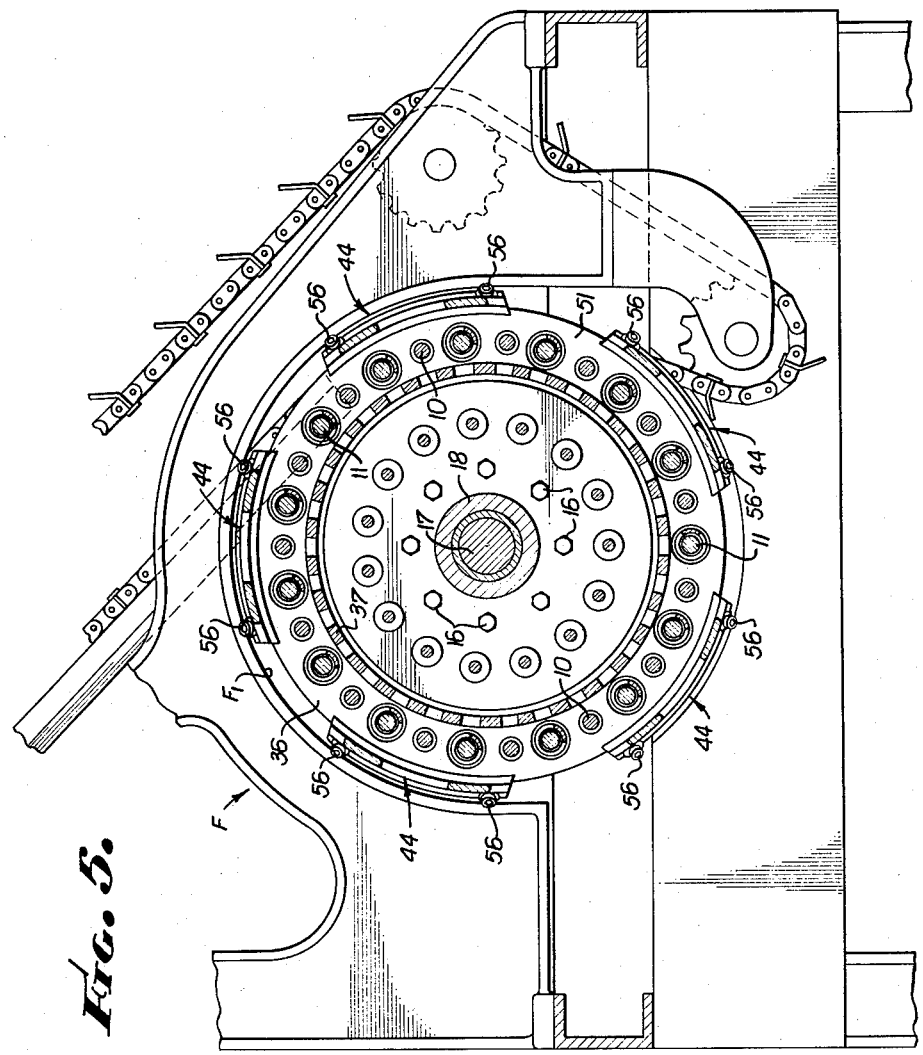
FIGURE 5 is a vertical section of the machine taken on the line 5—5 of FIGURE 1.

Preferably, a plurality of torque plates of the character described are employed in peripherally spaced arrangement as illustrated in FIGURE 5.

While I have herein shown and described the invention in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

What I claim is:

1. In an article handling machine the combination of: a rotary drum assembly formed of axially separated generally annular members, bridging means interconnecting said members, one of said annular members embodying a peripheral edge region having a radial plane surface terminating at an annular cylindrical surface whereby said edge region presents a shoulder generally right angular in cross section, portions of said machine substantially circumscribing said edge region of said annular member outwardly of and adjacent said cylindrical surface, a torque plate rigidifying said assembly, said torque plate embodying a flange at one end presenting a notch generally right angular in cross section having intersecting faces confronting and bearing upon the respective surfaces of the peripheral edge region of said one annular member, said flange having an unthreaded bore therethrough the axis of which bore is oblique to said radial plane surface, a threaded bore in the peripheral edge region of said one annular member opening to and having an axis coincident with the axis of said unthreaded bore, said flange embodying an external flat tension face spaced from said frame member in a direction axially of said drum assembly, a machine bolt extending through said unthreaded bore and threaded into said threaded bore with its head seating upon said tension face and permanently exposed externally thereof for accessibility by a tool and rigidly but removably securing the torque plate and said one annular member together with a force compressing the respective confronting surfaces and faces together, and means rigidly but removably securing the torque plate and the other said annular member together.

2. A combination as defined in claim 1 in which the axis of the bores generally intersects the angular edge of the radial plane surface and cylindrical surface of said peripheral edge region.

3. A combination as defined in claim 1 in which the axis of the bores generally intersects the angular edge of the radial plane surface and cylindrical surface of said peripheral edge region and generally bisects the angle between the two surfaces whereby the machine bolt applies force at generally equal angles upon both surfaces.

References Cited in the file of this patent

UNITED STATES PATENTS

| | | |
|---|---|---|
| 1,157,469 | Von Philip | Oct. 19, 1915 |
| 2,456,425 | Nemec | Dec. 14, 1948 |
| 2,821,227 | Kagley et al. | Jan. 28, 1958 |